(12) United States Patent
Dzafic et al.

(10) Patent No.: US 10,337,587 B2
(45) Date of Patent: *Jul. 2, 2019

(54) DUAL-CLUTCH SEVEN SPEED TRANSMISSION ARRANGEMENT

(71) Applicant: VOLVO CAR CORPORATION, Gothenburg (SE)

(72) Inventors: Ahmet Dzafic, Molndal (SE); Mathias Jorgensson, Stenungsund (SE)

(73) Assignee: VOLVO CAR CORPORATION, Gothenburg (SE)

( * ) Notice: Subject to any disclaimer, the term of this patent is extended or adjusted under 35 U.S.C. 154(b) by 231 days.

This patent is subject to a terminal disclaimer.

(21) Appl. No.: 14/868,520

(22) Filed: Sep. 29, 2015

(65) Prior Publication Data

US 2016/0097438 A1 Apr. 7, 2016

(30) Foreign Application Priority Data

Oct. 6, 2014 (EP) .................................. 14187692

(51) Int. Cl.
*F16H 3/00* (2006.01)
*B60W 10/02* (2006.01)
(Continued)

(52) U.S. Cl.
CPC ............ *F16H 3/006* (2013.01); *B60K 6/105* (2013.01); *B60K 6/36* (2013.01); *B60K 6/38* (2013.01);
(Continued)

(58) Field of Classification Search
CPC . B60K 6/36; B60K 6/38; B60K 6/105; B60K 6/547; F16H 3/006; F16H 3/093; F16H 2003/0931; F16H 2200/0056
(Continued)

(56) References Cited

U.S. PATENT DOCUMENTS

| 4,588,040 A | * | 5/1986 | Albright, Jr. | ............ | B60K 6/30 |
| | | | | | 180/165 |
| 6,887,180 B2 | * | 5/2005 | Pels | ........................ | B60K 6/36 |
| | | | | | 477/3 |

(Continued)

FOREIGN PATENT DOCUMENTS

| DE | 10209514 A1 | 10/2002 |
| DE | 112012004159 T5 | 7/2014 |

(Continued)

OTHER PUBLICATIONS

Extended European Search Report dated May 28, 2015, Application No. 14187692.0-1752, Applicant Volvo Car Corporation, 8 Pages.

(Continued)

*Primary Examiner* — William C Joyce
(74) *Attorney, Agent, or Firm* — Brooks Kushman P.C.

(57) ABSTRACT

A dual-clutch seven speed transmission arrangement comprises a dual-clutch gearbox, a drive machine and a transfer transmission. The dual clutch gearbox comprises first and second input shafts provided with first and second input clutches. The first input shaft is provided with at least first and second gearwheels, which are arranged to host three even and one reverse drive gear, and the second input shaft is arranged to host four odd drive gears. Furthermore, the first input shaft is a hollow shaft enclosing the second input shaft. The drive machine is a flywheel and the transfer transmission meshes with the first gearwheel that also hosts a fourth drive gear of the dual clutch gearbox.

20 Claims, 5 Drawing Sheets

(51) Int. Cl.
  *B60W 10/113* (2012.01)
  *B60W 20/40* (2016.01)
  *B60K 6/36* (2007.10)
  *B60K 6/38* (2007.10)
  *B60K 6/547* (2007.10)
  *B60K 6/10* (2006.01)
  *F16H 3/093* (2006.01)

(52) U.S. Cl.
  CPC ............ *B60K 6/547* (2013.01); *B60W 10/02* (2013.01); *B60W 10/113* (2013.01); *B60W 20/40* (2013.01); *F16H 3/093* (2013.01); *B60W 2710/021* (2013.01); *B60W 2710/1005* (2013.01); *F16H 2003/0931* (2013.01); *F16H 2200/0056* (2013.01); *Y02T 10/6204* (2013.01); *Y02T 10/6282* (2013.01); *Y10S 903/909* (2013.01); *Y10S 903/912* (2013.01); *Y10S 903/946* (2013.01)

(58) Field of Classification Search
  USPC .................................................... 74/330, 661
  See application file for complete search history.

(56) References Cited

U.S. PATENT DOCUMENTS

| | | | |
|---|---|---|---|
| 8,622,860 B2* | 1/2014 | Versteyhe | B60K 6/105 475/1 |
| 8,708,081 B1* | 4/2014 | Williams | B60K 6/105 180/165 |
| 9,003,907 B2 | 4/2015 | Weller et al. | |
| 2015/0159735 A1* | 6/2015 | Dzafic | F16H 3/006 74/661 |

FOREIGN PATENT DOCUMENTS

| | | |
|---|---|---|
| EP | 2292951 A1 | 3/2011 |
| EP | 2662594 A1 | 11/2013 |
| WO | 2013051120 A1 | 4/2013 |
| WO | 2013/178980 A1 | 5/2013 |

OTHER PUBLICATIONS

Chinese First Office Action dated Jan. 3, 2019, Application No. 201510626972.6, Applicant Volvo Car Corporation, 7 Pages.

* cited by examiner

DUAL-CLUTCH SEVEN SPEED TRANSMISSION ARRANGEMENT

CROSS-REFERENCE TO RELATED APPLICATIONS

This application claims foreign priority benefits under 35 U.S.C. § 119(a)-(d) to European patent application number EP 14187692.0, filed Oct. 6, 2014, which is incorporated by reference in its entirety.

TECHNICAL FIELD

The present disclosure relates to a dual-clutch seven speed transmission, especially an arrangement for a hybrid vehicle.

BACKGROUND

Hybrid vehicles, such as hybrid electric vehicles (HEV) or plugin-in hybrid electric vehicles (PHEV), typically comprise a drive train with a gearbox for allowing the vehicle to use different gears at different speeds. This practice is common both for hybrid vehicles and traditional vehicles, such as vehicles with single internal combustion engines.

Transmission arrangements for hybrid vehicles in difference from transmission arrangements for traditional vehicles need to be adapted for power input from multiple sources. In addition, hybrid vehicles are often produced to be energy efficient and thereby needs to utilize energy efficient gearboxes.

In prior art it is well known to use dual-clutch transmissions for vehicles in order to decrease the time of gear changes and optimize fuel consumption in relation to use of traditional automatic gearboxes or manual gearboxes. The dual-clutch transmission can fundamentally be described as two manual gearboxes working as one unit while contained within a single housing. In general, dual-clutch gearboxes comprise a twin-clutch configuration creating a semi-automatic or fully automatic gearbox that can prepare the next gear prior to a gear change by utilizing the two clutches in combination with two input shafts. Thereby the time required to switch into the next gear is minimized and fuel is saved. One further advantage with the dual-clutch transmission arrangement is that the hydraulic clutch associated with traditional automatic gearboxes can be removed. This is beneficial in relation to fuel saving.

The implementation of extra parts, such as the dual-clutch configuration, presents problems in relation to the size of the gearbox. This is a difficult problem especially for gearboxes with a high number of gears wherein it is desired to minimize the number of dependencies between the gears. A gear dependency is when at least two driven gears are driven by the same drive gear. E.g., a fourth and a sixth drive gear of a transmission both mesh with and are driven by one drive gear upon an input shaft. A change in gear ratio of the fourth drive gear would thereby affect the gear ratio of the sixth drive gear and vice versa. Furthermore, transversal installation of internal combustion engines provides an even greater challenge regarding fitting all the necessary components within the confined space of an engine bay. Modern vehicles require strict safety standards which limit the space within engine bays even more due to structural reinforcements and deformation zones.

Hybrid vehicles are characterized by their multiple engines and/or drive sources that are used to power the vehicle. The addition of an extra engine presents even more difficulties in relation to the available space and the difficulties encountered when fitting all the components in a vehicle. For hybrid electric vehicles wherein an internal combustion engine is combined with an electrical engine two different propulsion systems need to be connected to the transmission. This means that the drive train and gearbox needs to be adapted to the requirements of different propulsion systems. This adds additional modifications to the drive train of such vehicles which increase the size of the transmission. It is thereby essential for hybrid vehicles to comprise compact transmissions in order to maintain the size of such vehicles.

The conventional design of dual-clutch transmission arrangements for use with transverse internal combustion engine arrangements comprises gearboxes with six or less gears excluding the reverse gear. Furthermore, the conventional designs depend on multiple dependencies between gears as well as gear configurations that might mix even and odd gears in ways that limits the gear ratio of the gearbox. It is for example common to arrange both the lowest and highest gears at the same output shaft in compact dual-clutch gearboxes which limits the gear ratio options available. For example, by comprising the entire range of gears in a gearbox at one single output shaft, that single output shaft has to be adapted to conform to both the highest and lowest gear ratio that is possible for the gearbox to deliver. This limits the available options and especially decreases the options of reducing the gearbox size due to the limitations in drive gear options.

Creation of compact gearboxes thereby presents additional problems to address in relation of how to distribute the gears within the gearbox without increasing the size of the gearbox housing. It is beneficial to achieve as high gear ratio ranges as possible by creating a gearbox where the gear ratio between the lowest and highest gear can be decided without limiting factors such as gear dependencies.

With the above problems and solutions in mind it would therefore be advantageous to provide a compact dual-clutch transmission arrangement for a transverse engine arrangement in a hybrid vehicle that decreases, or maintains, the size of the gearbox housing while providing sufficient options in relation to gear dependencies and gear ratio.

SUMMARY

An object of the present disclosure is to provide a dual-clutch seven speed transmission arrangement for use with a transverse internal combustion engine arrangement in a hybrid vehicle wherein an additional drive motor is connected to the gearbox such that the gears in the dual-clutch gearbox still can be arranged in a space saving manner.

This object is achieved by the compact dual-clutch seven speed transmission arrangement and method as set forth in the appended claims.

Thus, the disclosure relates to a dual-clutch seven speed transmission arrangement, especially for use with a transverse engine arrangement in a hybrid vehicle. The dual-clutch seven speed transmission arrangement comprises a dual-clutch gearbox, a drive machine and a transfer transmission. The dual clutch gearbox comprises a first and a second input shaft provided with a first and a second input clutch, wherein said first input shaft is provided with at least a first and a second gearwheel, which are arranged to host three even and one reverse drive gear and said second input shaft is arranged to host four odd drive gears and said first input shaft is a hollow shaft enclosing said second input shaft. The drive machine is a mechanical flywheel or a combination of a mechanical flywheel and an electrical machine. A transfer transmission meshes with the first gearwheel that also hosts a fourth drive gear of the dual clutch gearbox. In the description below, references will be made to drive machine, whereby with drive machine any of a flywheel or a combination of a flywheel and an electrical machine is meant.

In a preferred embodiment of the dual-clutch seven speed transmission, the transmission is provided with only a flywheel. The advantage with the flywheel is that the flywheel is both a drive assembly and energy storage in one and the same device, which saves spaces in comparison with drive devices which are dependent on additional energy storage, such as an electrical machine, which needs an electrical battery.

Using a flywheel in combination with an electrical motor facilitates a down scaling of the electrical motor and the electrical battery.

To achieve the most beneficial effect of the flywheel, it is preferred that the flywheel is combined with a reduction gear, e.g., a gear step of preferably a planetary gear set, such that the speed output is lowered, which leads to less losses later stages of the speed/torque transfer to the main transmission. The reduction gear is preferably arranged in between the flywheel and the transfer transmission alternatively comprised in the transfer transmission as in input stage in the transfer transmission.

In the dual-clutch seven speed transmission arrangement, the input shaft for odd drive gears, i.e., the second input shaft, comprises drive gears for gear 1, 3, 5, and 7, and the input shaft for even drive gears, i.e., the first input shaft, comprises drive gears for gear 2, 4, 6, and reverse.

The distribution of the drive gears among the input shafts is important in relation to the size of the dual-clutch gearbox. The gear sets are arranged parallel with two gears on each side of the input shafts which allows for an improved utilization of dual output shafts.

In one embodiment of the dual-clutch seven speed transmission arrangement, the transmission further comprises a first and second output shaft, wherein said first output shaft comprises drive gears for gear 1, 3, 4, and reverse while said second output shaft comprises drive gears for gear 2, 5, 6, and 7.

Arranging dual output shafts provides options to further enhance the properties of dual-clutch gearboxes. It is for example common to arrange both the lowest and the highest gear at the same output shaft in conventional compact dual-clutch six speed gearboxes. However, such arrangements create limitations because they limit the gear ratio options available by arranging the entire gear ratio range at a single output shaft. This means that the gear ratio of one output shaft needs to cover the entire gear ratio range that the gearbox can provide, limiting the available options and especially decreasing the options of reducing the gearbox size. By dividing the gears between even and odd gears and further arrange dual output shafts it is possible to arrange the 1st and 7th gear at different output shafts providing possibilities for a larger ratio range in between.

In addition to arranging the 1st and 7th gear at different output shafts the specific arrangement of one embodiment of the disclosure where the three highest gears, 5, 6, and 7, are arranged at the same output shaft while three out of the four lowest gears are arranged at the other output shaft together with the reverse gear provides that the output shafts can be designed for different purposes. For example the output shafts in one embodiment of the disclosure could be designed so that one of the output shafts is a high gear ratio output shaft while the other is a low gear ratio output shaft.

In one embodiment of the dual-clutch seven speed transmission arrangement the dual-clutch gearbox comprises a single gear dependency between a 4th and a 6th drive gear, which thereby both are driven by one of the first and the second gearwheel, which also meshes with the transfer gear set. Hence, the first gearwheel meshes with three other gearwheels, in order to realize the 4th and the 6th drive gear and drive torque through the additional drive machine.

The number of gears that are dependent in relation to other gears in a gear box is one of the factors that limit the ratio range that is possible for a certain gearbox design. Multiple dependencies between gears present limitations by locking the gear ratio that can be used. By providing a solution with single gear dependency the gear ratio range can be significantly increased. Providing the transfer gear set to also mesh with the first gearwheel upon the first input shaft, realizes an axial compact solution to connect the additional drive mechanism to dual-clutch gear box.

In one embodiment of the dual-clutch seven speed transmission arrangement, the dual-clutch gearbox comprises a double gear dependency between a 3rd and a 5th drive gear and a 4th and a 6th drive gear. The first gearwheel, which drives the 4th and the 6th drive gear thereby still meshes with the transfer gear set. Hence, the one of the first and the second gearwheel meshes with three other gearwheels, in order to realize the 4th and the 6th drive gear and drive torque through the additional drive machine. The other one of the first and the second gearwheel thereby meshes with both the 3rd and the 5th drive gear.

The combination of the dual gear dependency and that the transfer gear set meshes with the first gearwheel provided an even more axial compact dual-clutch seven speed gear box.

In one embodiment of the dual-clutch seven speed transmission arrangement the additional drive mechanism, in an operational state, provides power to the drive train through said input shaft for even drive gears, and said input shaft for even drive gears can be switched between the even gears and reverse without intervention of an internal combustion engine.

The transfer gear set of the dual-clutch seven speed transmission arrangement can be any form of engaging mechanical means that can transfer torque between said drive mechanism and the dual-clutch gearbox, such as a chain, a belt, or a set of gears. In a preferred embodiment the transfer gear set is a continuously variable transmission (CVT) and in another preferred embodiment the transfer gear comprises at least two gear stages and two clutches in order to simulate a CVT.

In one embodiment the dual-clutch seven speed transmission arrangement is provided with a disconnection function between the drive machine and the dual-clutch seven speed gearbox. The disconnection function is typically realized with a clutch mechanism, such as a dog clutch, a synchronization clutch or a friction clutch.

The dual-clutch seven speed transmission arrangement is preferably provided in a vehicle comprising a combustion engine, which thereby connects to the clutches of the dual-clutch seven speed transmission. To realize a front wheel drive, the dual-clutch seven speed transmission arrangement is provided with a transverse engine arrangement. In a vehicle with a front wheel drive and transverse engine arrangement the axial compactness of the dual-clutch seven speed arrangement is extra beneficial.

A disengagement of both clutches in the dual-clutch seven speed transmission arrangement disengages the combustion engine from the rest of the power train, whereby the hybrid vehicle still can be driven on its even drive gears from the drive mechanism in the dual-clutch seven speed transmission arrangement.

The dual-clutch seven speed transmission arrangement enables that the drive machine can be used either stand alone or in combination with an internal combustion engine. The arrangement of drive gears wherein the drive machine is attached to the first input shaft also enables for the drive machine to utilize the different gears of that input shaft. The drive machine can thereby utilize all the even drive gears in the dual-clutch gearbox. Additionally, in one embodiment an internal combustion engine could utilize the odd drive gears simultaneously as the electrical motor utilizes the even drive gears.

Another aspect of the disclosure concerns a method for a hybrid vehicle provided with an internal combustion engine and a dual-clutch seven speed transmission arrangement according to any of the embodiments described above. The method comprises the steps of:

disengaging an internal combustion engine from the drive train by means of disengaging both input clutches in the dual-clutch seven speed transmission arrangement, engaging power from the drive mechanism acting upon the 4th drive gear of the input shaft for even drive gears, and switching between different drive gears of the first input shaft without the intervention of the internal combustion engine or the input clutches.

BRIEF DESCRIPTION OF THE DRAWINGS

Embodiments according to the disclosure will now be described with reference to the accompanying drawings, in which.

DETAILED DESCRIPTION

In the following, a detailed description of different embodiments of the disclosure is provided with reference to the accompanying drawings. It is to be understood, however, that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art. Furthermore, all examples herein should be seen as part of the general description and are therefore possible to combine in any way in general terms. Individual features of the various embodiments and methods may be combined or exchanged unless such combination or exchange is clearly contradictory to the overall function of the dual-clutch seven speed transmission arrangement.

Briefly described, the disclosure relates to a compact dual-clutch seven speed transmission arrangement 1 for use within a hybrid vehicle HB. The transmission arrangement 1 comprises a dual-clutch gearbox 2 and a drive machine 15, 115 coupled to the 4th gear of the dual-clutch gearbox. The transmission arrangement thereby allows for propulsion from both an internal combustion engine and the drive machine 15, 115. The transmission arrangement 1 further allows for propulsion from both the combustion engine CE and the drive machine 15, 115 to be sent to the drive train simultaneously in order for the hybrid vehicle HB to gain propulsion from both power sources simultaneously or individually. The drive machine 15 is a mechanical flywheel or an electrical machine or a combination of both.

Figure 1:
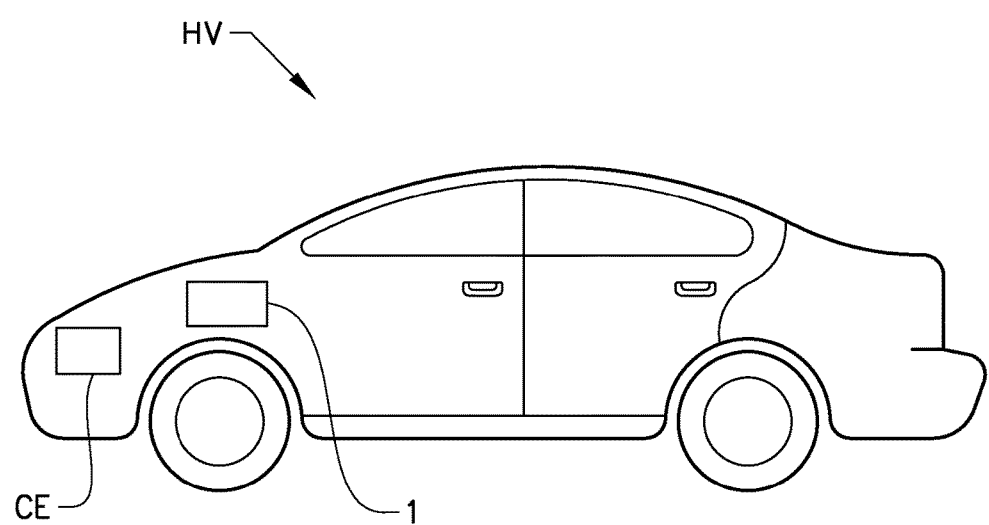
FIG. 1 schematically illustrates a hybrid vehicle in which a dual-clutch seven speed transmission arrangement is provided.

In FIG. 1 a schematically drawing of a hybrid vehicle HV is shown. The hybrid vehicle HV is provided with a power train with a combustion engine CE and a dual-clutch seven speed transmission arrangement 1, which will be described further below.

Figure 2:
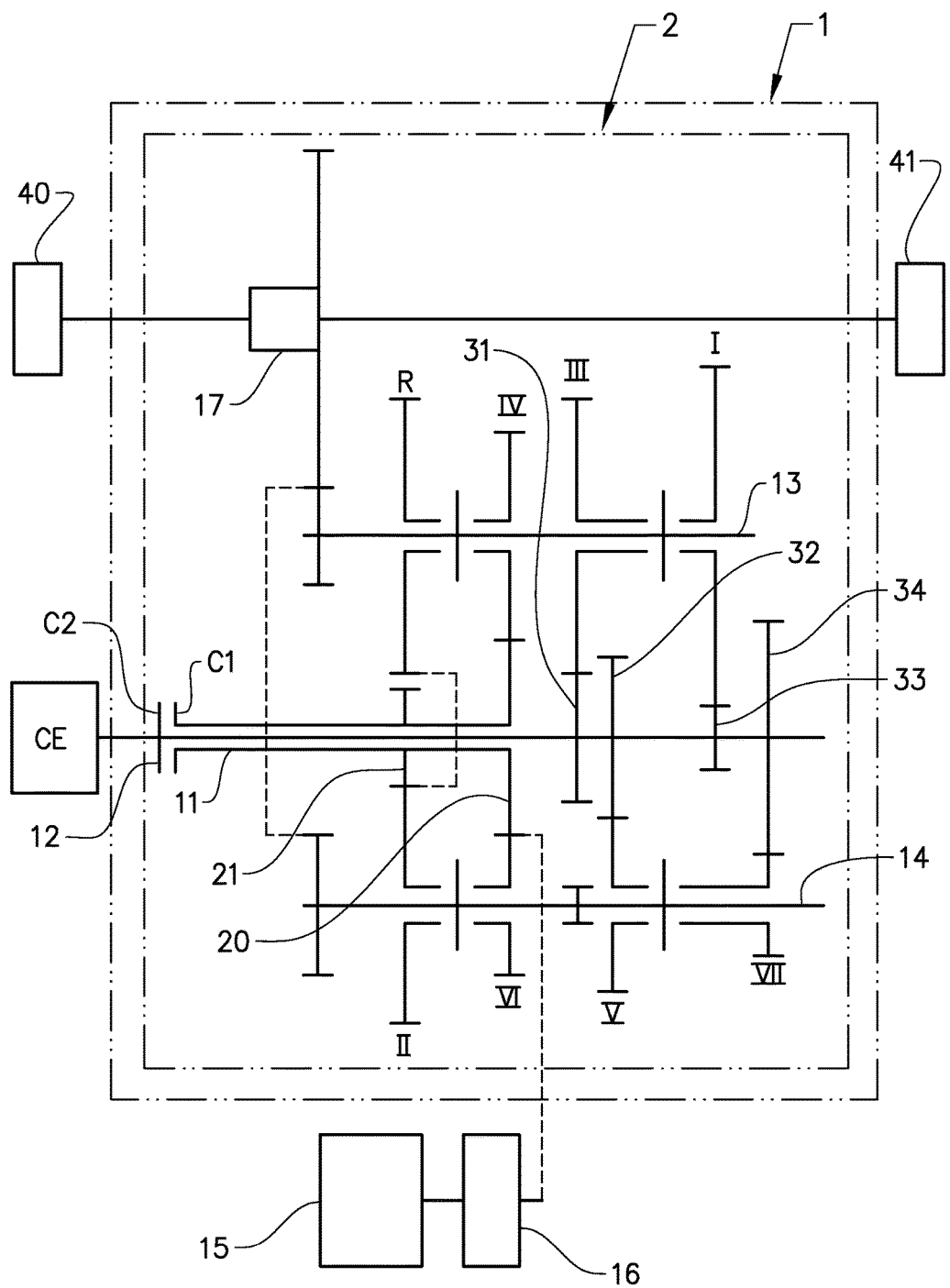
FIG. 2 schematically illustrates a power train of a hybrid vehicle provided with a dual-clutch seven speed transmission arrangement.

In FIG. 2 the power train of the hybrid vehicle HV in FIG. 1 is disclosed. The dual-clutch seven speed transmission arrangement 1 is provided with a dual-clutch seven speed gearbox 2, a drive machine 15 and a transfer transmission 16. The drive machine 15 is provided as a flywheel 15.

The dual-clutch seven speed transmission arrangement 1 comprises a dual-clutch gearbox 2 which comprises a first and a second input shafts 11, 12, coupled to a first and a second clutch C1, C2 that are arranged to engage and disengage in relation to an internal combustion engine CE. The first input shaft 11 is arranged for even drive gears II, IV, VI and the reverse gear R and the second input shaft 12 is arranged for odd drive gears I, III, V, VII, whereby the first input shaft 11 is a hollow shaft, in which the second input shaft 12 is arranged. The first to the seventh drive gear are marked with roman numerals and the reverse gear is marked with R for reference. The first input shaft is further provided with a first and a second gearwheel 20, 21, which drives the even gears II, IV, VI and reverse gear R allocated to the first input shaft 11.

The first input shaft 11 is provided with a first and a second gearwheel 20, 21, which meshes with drive gears upon the first and second output shafts 13, 14. In the embodiment of the dual-clutch seven speed transmission arrangement 1 disclosed in 1, there are two gear dependencies. Between the second II and reverse R gear and between the fourth IV and the sixth VI gear, i.e., both the second II and the reverse R gear upon the first and second output shaft 13, 14 respectively are driven by the same gearwheel 21 on the first input shaft 11 and both the fourth IV and the sixth VI gear upon the second and first 14, 13 respectively are driven by the same gearwheel 20 on the first input shaft 11. A gear arrangement with a double gear dependency secures a compact axial design of the dual-clutch gear box 2.

The second input shaft 12 is provided inside the hollow first input shaft 11 and is provided with four 31, 32, 33, 34 output gearwheels, which mesh with drive gears upon the first and second output shafts 13, 14, in order to realize the first, third, fifth and seventh I, III, V, VII drive gear. In the embodiment disclosed there are no dependencies between the odd drive gears I, III, V, VII. However, the second input shaft 12 can be designed with one or more dependency between the odd drive gears I, III, V, VII, without departing from the scope of the disclosure.

As can be seen in FIG. 1, the differential 17 is connected to both the first and the second output shaft 13, 14 in order to provide power to the drive wheels 40, 41.

The flywheel 15 directly connected to the transfer transmission 16, which meshes with the first gearwheel 20 upon the first input shaft 11. The flywheel 15 can thereby drive the hybrid vehicle HV on all the drive gears associated with the first input shaft 11. The flywheel 15 and the transfer transmission 16 will be described in greater detail below.

Dividing the gears between an input shaft 11 for even drive gears and an input shaft 12 for odd drive gears I, III, V, VII presents multiple benefits for the dual-clutch gearbox 2.

By dividing the gears between an input shaft 11 for even drive gears II, IV, VI and an input shaft 12 for odd drive gears I, III, V, VII and arranging those in connection to first and second clutches C1, C2, respectively, it is possible to always keep the next gear in a gear shifting sequence preloaded at the clutch currently disengaged.

In one example embodiment the first clutch C1 is engaged and provides propulsion from the internal combustion engine CE through any of the odd drive gears I, III, V, VII to the differential 17. The second clutch C2 is disengaged, which means that no connection is established between the internal combustion engine CE and the input shaft 11 for even drive gears II, IV, VI. The input shaft 11 for even drive gears II, IV, VI is instead engaged with the flywheel 15 and provides propulsion through any of the even drive gears II, IV, VI to the differential 17. This means that propulsion is provided from both the internal combustion engine CE and the flywheel 15.

Due the arrangement of the flywheel 15 with a transfer transmission 16 that meshes with the first gearwheel 20, which first gearwheel 20 also drives at least the fourth IV drive gear it is possible to construct an axial compact dual-clutch transmission arrangement 1. The arrangement 1 disclosed is provided with a double gear dependency between the fourth and the sixth gear IV, VI and between the second and reverse gear II, R, which enables a high compactness. However, even though not disclosed, the dual-clutch transmission arrangement 1 can be constructed with either one or without a gear dependency. However the inventive arrangement of the flywheel 15 enables a flexible construction of the dual-clutch transmission arrangement 1, depending on which properties that are most preferred, i.e., axial compactness, high gear ratio flexibility or a compromise between the both.

In the embodiment disclosed in FIG. 1, the second input shaft 12 for odd drive gears I, III, V, VII all the drive gears I, III, V, VII are independent from each other meaning that no dependencies exist between any gears. The odd drive gears 31 can thereby be changed independently depending on the desired gear ratio. At the end of the second input shaft 12 for odd drive gears I, III, V, VII is one of the second input clutch C2 arranged which engages and disengages power from the internal combustion engine CE. The transfer transmission 16 can comprise any of or a combination of the following elements; a planetary gear set, one or a plurality of gear steps, one or a plurality of clutches, a CVT and/or a belt or chain transmission. In one embodiment, the transfer transmission 16 comprises three gearwheels forming two gear steps.

Figure 3:
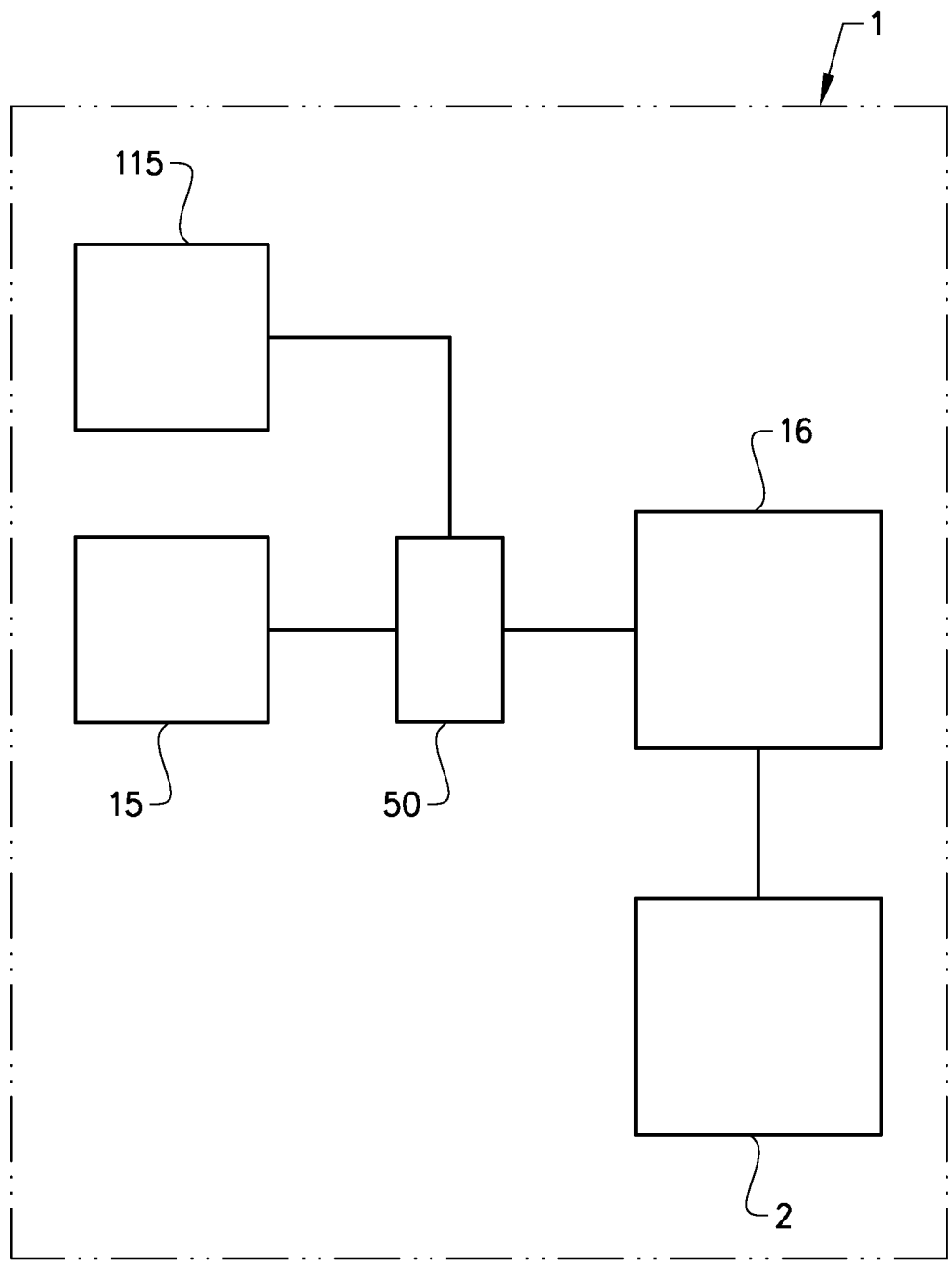
FIG. 3 schematically illustrates an arrangement of a dual-clutch seven speed transmission arrangement provided with both a flywheel and an electrical machine as a drive machine.

Drive machine is Flywheel, in FIG. 3 is an alternative embodiment disclosed in which the drive machine is a combination of a flywheel 15 and an electrical machine 115. The hybrid vehicle HV would in such a construction have three different drive sources, the combustion engine CE, the flywheel 15 and the electrical machine 115.

FIG. 3 discloses an embodiment of the dual-clutch seven speed transmission arrangement 1, in which the gearbox 2, the transfer transmission 16 and the drive mechanism 15, 115 are disclosed as connected boxes, in order to illustrate how a plurality of drive sources can be combined to create the drive mechanism 15, 115. In the disclosed embodiment the flywheel 15 and an electrical machine 115 together forms the drive source 11, 115. The flywheel 15 and the electrical machine 115 are connected through a planetary gear set 50, which in turn is connected to the transfer transmission 16. It is preferred that the flywheel 15 is connected to a sun wheel of the planetary gear set 50, the electrical machine 115 is connected to a ring wheel of the planetary gear set 50 and whereby the transfer transmission 16 is connected to the planet carrier of the planetary gear set 50. The transfer transmission 16 can comprise any of or a combination of the following elements; one or a plurality of gear steps, one or a plurality of clutches and/or a belt or chain transmission. In one embodiment, the transfer transmission 16 comprises three gearwheels forming two gear steps.

Figure 4A:
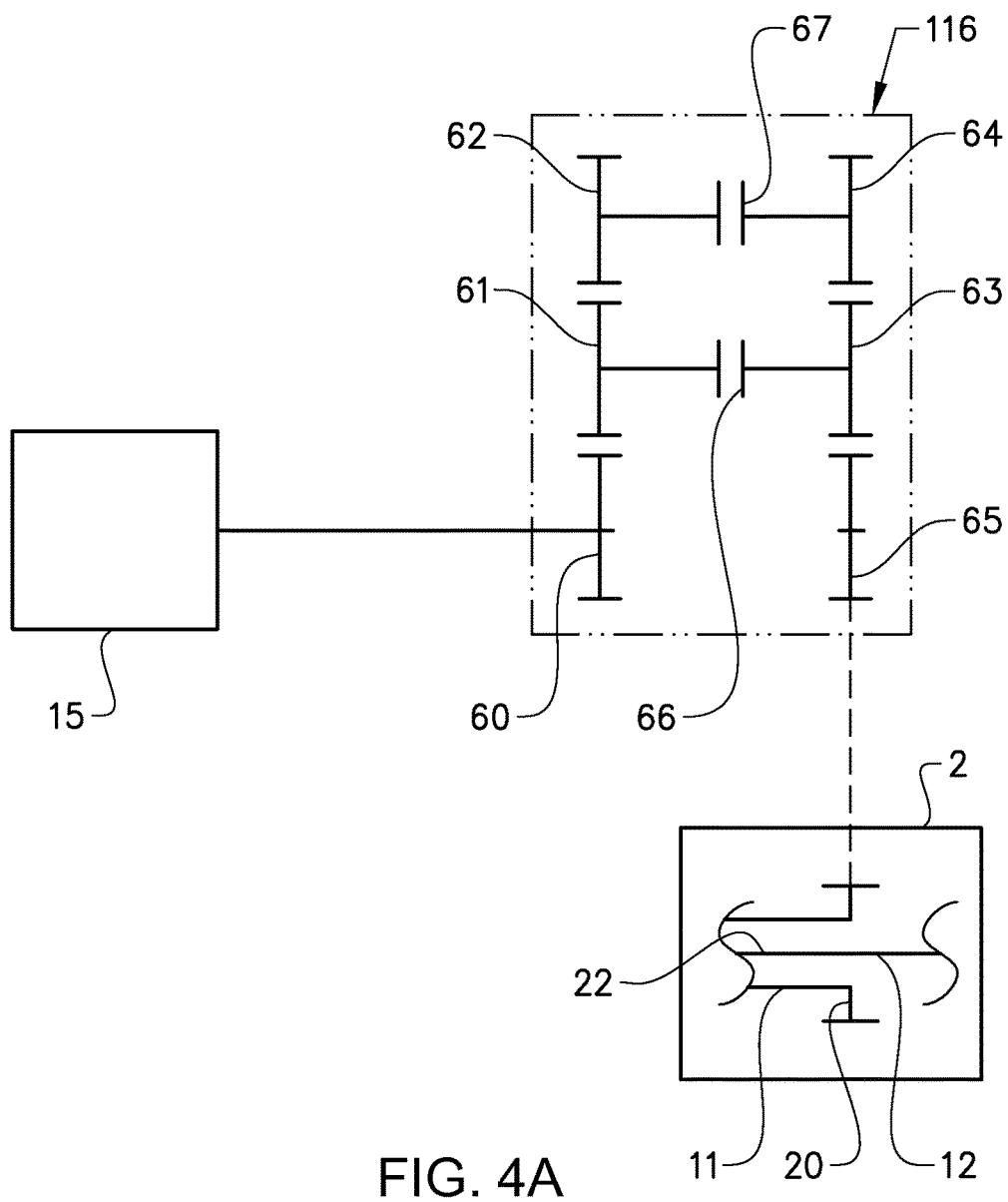
FIG. 4A schematically illustrates an embodiment of a transfer transmission 16.

FIG. 4A discloses an embodiment of the dual-clutch seven speed transmission arrangement 1, provided with a flywheel 15 as additional drive source and a transfer transmission 116. The transfer transmission 116 comprises six gearwheels 60-65 and two clutches 66, 67. Three of the gearwheels 60-62 are provided on an input side and the other three gearwheels 63-65 are provided on an output side. A drive torque delivered from the drive mechanism 15 over the planetary gear set 50 to the dual-clutch seven speed gear box 2 is passing at least over the first gear 60 (input gear) and the last and sixth gear 65 (output gear), which is meshing with the first gearwheel 20 of the first input shaft 11. The first gear 60 meshes with a second gear 61, which also meshes with a third gear 62. The sixth gear 65 additionally meshes with a fifth gear 63, which also meshes with a fourth gear 64. The third gear 62 and the fourth gear 64 are connected with a clutch 67 and the second gear 61 and the fifth gear 63 are connected with a clutch 66. By controlling the clutches 66, 67 between disengaged and a plurality of semi-engaged and engaged positions a variation in torque and speed can be achieved. Additional pairs of gearwheels and clutches can be introduced in the transfer transmission 116 in order to provide the possibility to boost the vehicle 1 at even larger gear range.

Figure 4B:
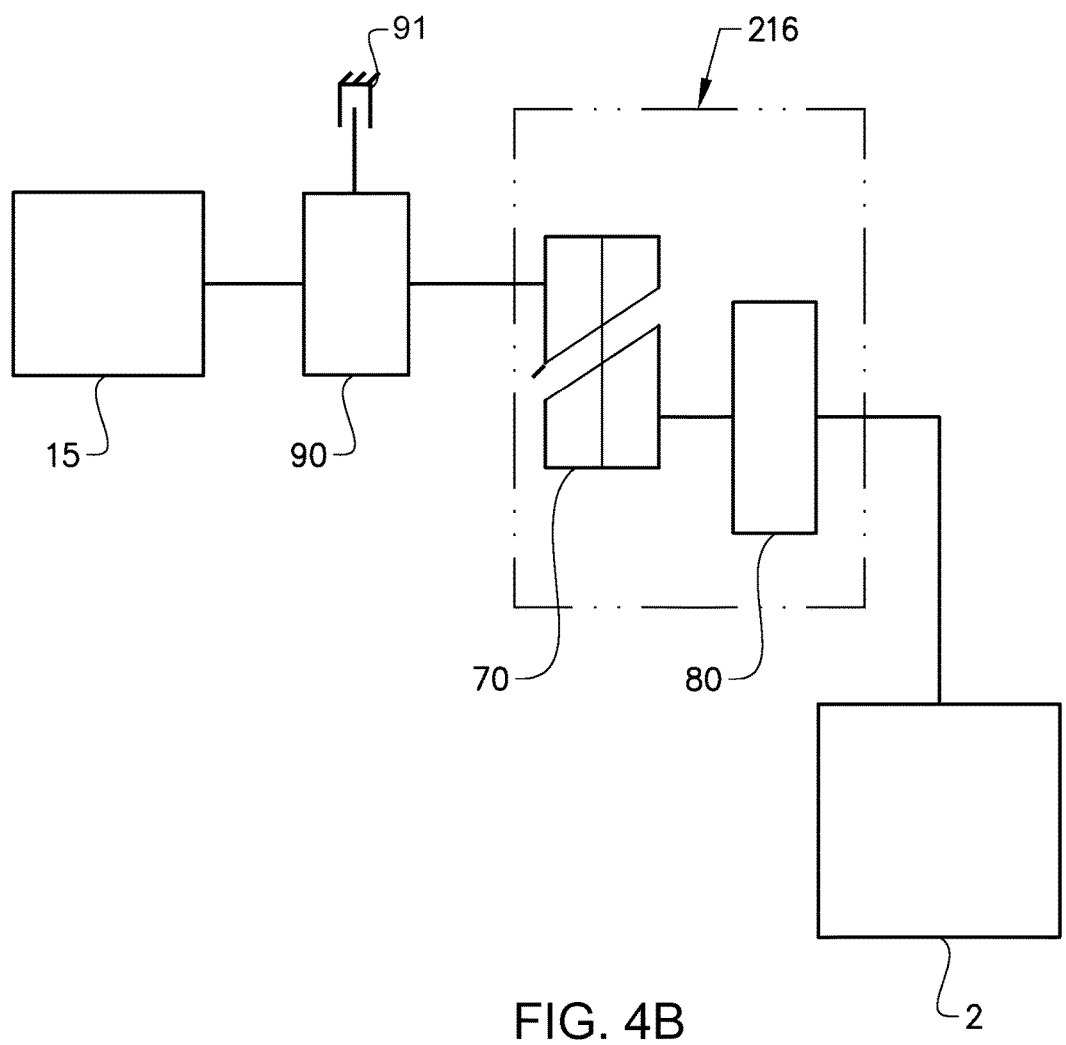
FIG. 4B schematically illustrates an embodiment of a transfer transmission 16.

The embodiment disclosed in FIG. 4B is provided with a planetary gear set 90. By providing a planetary gear set 90 before transfer transmission 216, which includes a continuously variable transmission (CVT) as explained below, the input speed into the CVT may be reduced in order to increase efficiency. In that regard, higher efficiency with the CVT may be realized at lower speeds. Furthermore, the flywheel may be disconnected.

FIG. 4B discloses a transfer transmission 216 provided as a CVT 70 and a range extender 80. The range extender is preferably a planetary gear set. The CVT 70 provides a controllable torque and speed output from the drive mechanism 15, 115 and the range extender 80 provides high and low range for the transfer transmission, whereby the gear range of the transfer transmission is extended. In the between the flywheel 15 and the transfer transmission 216 a planetary gear set 90 is arranged as a reduction gear, such that the speed output from the flywheel 15 is lowered before it is inputted into the CVT 70 and to freewheel the flywheel 70, when it is storing energy. To achieve this, the output of the flywheel 15 is connected to the sun wheel of the planetary gear set 90 and the input of the CVT 70 is connected to planet carrier of the planetary gear set 90. The ring gear of the planetary gear set is connected to a brake 91, which can fixate the ring gear in a locked position. When the brake 91 is open the flywheel 15 can spin without any torque transfer to the transfer transmission 216. When the brake 91 is locked the planetary gear set 90 acts as a reduction gear, reducing the speed from the flywheel 15 output to the CVT 70 input.

All embodiments the drive mechanism 15, 115 in dual-clutch seven speed transmission arrangement can either provide driving power or be used to recuperate kinetic energy of the hybrid vehicle HV.

While exemplary embodiments are described above, it is not intended that these embodiments describe all possible forms of the disclosure. The words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A dual-clutch seven speed transmission arrangement comprising:
   a dual-clutch gearbox comprising first and second input shafts provided with first and second input clutches, wherein the first input shaft is a hollow shaft enclosing the second input shaft, the first input shaft is provided with at least first and second gearwheels, which are arranged to host three even drive gears and one reverse gear, and the second input shaft is arranged to host four odd drive gears;
   a drive machine comprising a flywheel and no electric motor; and
   a transfer transmission connected to the flywheel and that meshes with the first gearwheel, which is arranged to drive a fourth drive gear of the dual-clutch gearbox, wherein the fourth drive gear is separate from the transfer transmission.

2. The dual-clutch seven speed transmission arrangement according to claim 1 wherein the dual-clutch gear box further comprises first and second output shafts, wherein the first output shaft comprises drive gears for a first drive gear, a third drive gear, the fourth drive gear and the reverse gear, while the second output shaft comprises drive gears for a second drive gear, a fifth drive gear, a sixth drive gear and a seventh drive gear.

3. The dual-clutch seven speed transmission arrangement according to claim 1 wherein the dual-clutch gearbox comprises a single gear dependency between the fourth drive gear and a sixth drive gear, which both are driven by the first gearwheel that meshes with the transfer transmission.

4. The dual-clutch seven speed transmission arrangement according claim 1 wherein the dual-clutch gearbox comprises a gear dependency between the fourth drive gear and a sixth drive gear.

5. The dual-clutch seven speed transmission arrangement according to claim 1 wherein the flywheel in an operational state is configured to provide power to one gearwheel through the first input shaft for even drive gears, and the first input shaft for even drive gears can be switched between the even drive gears and the reverse gear without intervention of an internal combustion engine.

6. The dual-clutch seven speed transmission arrangement according to claim 1 further comprising a disconnection function between the flywheel and the dual-clutch gearbox.

7. The dual-clutch seven speed transmission arrangement according to claim 1 wherein the transfer transmission comprises a chain and/or a belt and/or a set of gears.

8. The dual-clutch seven speed transmission arrangement according to claim 1 wherein the transfer transmission comprises a continuously variable transmission or at least two gear stages and two clutches.

9. A vehicle comprising a transverse engine arrangement provided with an internal combustion engine and a dual-clutch seven speed transmission arrangement according to claim 1.

10. The vehicle according to claim 9 wherein disengagement of both clutches disengages the internal combustion engine from the dual-clutch seven speed transmission arrangement of the vehicle.

11. The vehicle according to claim 9 wherein the flywheel is arranged to provide power to front wheels of the vehicle.

12. A method for controlling the vehicle according to claim 9, the method comprising:
   disengaging the internal combustion engine from the dual-clutch seven speed transmission arrangement by disengaging both input clutches;
   engaging power from the flywheel attached to the fourth drive gear of the input shaft for even drive gears; and
   switching between different drive gears of the first input shaft without intervention of the internal combustion engine or the clutches.

13. The dual-clutch seven speed transmission arrangement according to claim 1 wherein the flywheel is both a drive assembly and energy storage.

14. The dual-clutch seven speed transmission arrangement according to claim 1 wherein the dual-clutch gearbox comprises a gear dependency between the reverse gear and a second drive gear of the even drive gears.

15. The dual-clutch seven speed transmission arrangement according to claim 1 wherein the dual-clutch gearbox comprises a single gear dependency between the fourth drive gear and a sixth drive gear of the even drive gears, and a single gear dependency between the reverse gear and a second drive gear of the even drive gears.

16. The dual-clutch seven speed transmission arrangement according to claim 15 wherein the fourth drive gear and the sixth drive gear are driven by the first gearwheel, and the reverse gear and the second drive gear are driven by the second gearwheel.

17. A dual-clutch seven speed transmission arrangement comprising:
   a dual-clutch gearbox comprising first and second input shafts provided with first and second input clutches, wherein the first input shaft is a hollow shaft enclosing the second input shaft, the first input shaft is provided with at least first and second gearwheels, which are arranged to host three even drive gears and one reverse gear, and the second input shaft is arranged to host four odd drive gears;
   a drive machine comprising a flywheel; and
   a transfer transmission connected to the flywheel and that meshes with the first gearwheel, which is arranged to drive a fourth drive gear of the dual-clutch gearbox, wherein the fourth drive gear is separate from the transfer transmission.

18. A vehicle comprising a transverse engine arrangement provided with an internal combustion engine and the dual-clutch seven speed transmission arrangement according to claim 17.

19. The vehicle according to claim 18 wherein the clutches of the dual-clutch seven speed transmission arrangement are disengageable to disengage the internal combustion engine from the dual-clutch seven speed transmission arrangement.

20. The vehicle according to claim 18 wherein the flywheel is arranged to provide power to front wheels of the vehicle.

* * * * *